(12) United States Patent
Cipelli et al.

(10) Patent No.: US 7,253,357 B2
(45) Date of Patent: Aug. 7, 2007

(54) PULSED VOLTAGE SURGE RESISTANT MAGNET WIRE

(75) Inventors: Celso Luiz Cipelli, Cerquilho (BR); Hideo Ichise, São Paulo (BR); Claudemir Fernando Furlan, Cerquilho (BR)

(73) Assignee: PPE Invex Produtos Padronizados E Epeciais Ltda., Cerquilho, Sp (BR)

( * ) Notice: Subject to any disclaimer, the term of this patent is extended or adjusted under 35 U.S.C. 154(b) by 0 days.

(21) Appl. No.: 10/498,993

(22) PCT Filed: Dec. 18, 2002

(86) PCT No.: PCT/BR02/00188

§ 371 (c)(1),
(2), (4) Date: Feb. 2, 2005

(87) PCT Pub. No.: WO03/056575

PCT Pub. Date: Jul. 10, 2003

(65) Prior Publication Data

US 2005/0118422 A1 Jun. 2, 2005

(30) Foreign Application Priority Data

Dec. 21, 2001 (EP) .................................. 01130646

(51) Int. Cl.
*H01B 7/00* (2006.01)
(52) U.S. Cl. ..................... 174/36; 174/110 R
(58) Field of Classification Search ............ 174/110 R, 174/120 R, 121 R, 121 SR; 428/375, 379; 525/444
See application file for complete search history.

(56) References Cited

U.S. PATENT DOCUMENTS

| | | | |
|---|---|---|---|
| 4,393,809 A | | 7/1983 | Hilker |
| 4,546,041 A | | 10/1985 | Keane et al. |
| 4,612,246 A | * | 9/1986 | Goldberg et al. ............ 428/379 |
| 4,716,079 A | | 12/1987 | Sano et al. |
| 5,254,408 A | * | 10/1993 | Takeuchi et al. ............ 428/383 |
| 5,470,657 A | * | 11/1995 | Hayami ...................... 428/373 |
| 5,861,578 A | * | 1/1999 | Hake et al. ............. 174/120 R |
| 5,902,681 A | * | 5/1999 | Ueoka et al. ............... 428/383 |
| 6,060,162 A | | 5/2000 | Yin et al. |
| 6,087,591 A | * | 7/2000 | Nguyen et al. ......... 174/110 R |
| 6,087,592 A | | 7/2000 | Nagel et al. |
| 6,100,474 A | | 8/2000 | McGregor et al. |
| 6,180,888 B1 | | 1/2001 | Yin et al. |

(Continued)

FOREIGN PATENT DOCUMENTS

EP          0 287 813          10/1988

(Continued)

OTHER PUBLICATIONS

JP 06-275128 A, Sep. 30, 1994; Derwent Publications Ltd., Abstract, XP-002188819.

*Primary Examiner*—William H. Mayo, III
(74) *Attorney, Agent, or Firm*—Finnegan, Henderson, Farabow, Garrett & Dunner, L.L.P.

(57) ABSTRACT

A magnet wire including at least one conductor and at least one insulating layer. The insulating layer includes (a) at least a polymeric resin; (b) at least a fluorinated organic filler; and (c) at least a non-ionic fluorinated surfactant. The magnet wire is endowed with high resistance to pulsed voltage surges.

49 Claims, 3 Drawing Sheets

U.S. PATENT DOCUMENTS

| | | | |
|---|---|---|---|
| 6,329,055 B1 * | 12/2001 | Higashiura et al. | 438/383 |
| 6,531,559 B1 * | 3/2003 | Smith et al. | 526/255 |
| 6,914,093 B2 * | 7/2005 | Xu | 524/406 |
| 6,977,280 B2 * | 12/2005 | Lee et al. | 525/199 |
| 2002/0039869 A1 * | 4/2002 | Achille | 442/417 |
| 2003/0031868 A1 * | 2/2003 | Shue et al. | 428/375 |
| 2005/0096429 A1 * | 5/2005 | Lee et al. | 525/178 |

FOREIGN PATENT DOCUMENTS

| | | |
|---|---|---|
| EP | 0 811 483 A1 | 12/1997 |
| JP | 50-13957 | 5/1975 |
| JP | 56-106976 | 8/1981 |
| JP | 3-245417 | 11/1991 |
| JP | 4-115411 | 4/1992 |
| JP | 6-275128 | 9/1994 |
| WO | WO 96/42089 | 12/1996 |

* cited by examiner

PULSED VOLTAGE SURGE RESISTANT MAGNET WIRE

CROSS REFERENCE TO RELATED APPLICATIONS

This application is a national phase application based on PCT/BR02/00188, filed Dec. 18, 2002, the content of which is incorporated herein by reference, and claims the priority of European Patent Application No. 01130646.1, filed Dec. 21, 2001.

BACKGROUND OF THE INVENTION

1. Field of the Invention

The present invention relates to a magnet wire with high resistance to pulsed voltage surges.

More particularly, the present invention relates to a magnet wire, which is highly resistant to repetitive or pulsed high voltage spikes or surges, including at least a conductor and at least an insulating layer consisting of a composition which comprises at least a polymeric resin, at least a fluorinated filler and at least a non-ionic fluorinated surfactant.

The present invention also relates to a method for improving resistance to pulsed voltage surges of a magnet wire.

2. Description of the Related Art

Various types of variable frequency or pulse-width modulated (PWM) and/or inverter adjustable speed drives on AC motors and their affect on motor operation are known. PWM drives are known to have significant harmonics and transients which may alter the motor performance characteristics and life expectancy. The effects of maximum voltage, rate of rise, switching frequencies, resonances and harmonics have all been identified.

The PWM inverter is one of the newest and fastest evolving technologies in non-linear devices used in motor drive system. The motivation for using PWM inverters is speed control of an AC motor comparable to the prior mechanical or DC adjustable speed drives without loss of torque. With the increased emphasis of energy conservation and lower cost, the use of higher performance PWM drives has grown at an exponential rate. However, it has been found that these PWM drives cause premature failure of the magnet wire insulation systems used in such AC motors.

While it is known that conventional enamel compositions degrades when exposed to high voltage corona discharge, and that corona is discharged between adjacent windings of motor insulation, due to the inevitable voids and the high voltage ionization of air in the voids of the motor stator and rotor insulation windings, it has been found that insulation failure of motor driven by variable frequency, PWM and/or inverter drives is not primarily a corona insulation degradation mechanism.

As a matter of fact, corona ageing and magnet wire failure conditions may be distinguished from pulsed voltage surge ageing and magnet wire failure conditions. Corona ageing conditions occur in the presence of gas (usually air in magnet wire windings) at positions of localized high electrical stress (AC and DC), that is strong enough to break down or ionize the gas, to produce electron or ion energy strong enough to break down polymer chain or to create ionic radicals via chemical reactions. The chemical reactions result in polymer degradation. Corona discharge is a relatively "cold discharge" and temperature is usually not a substantial factor like in the case of pulsed voltage surges. Magnet wire ageing/failure due to corona is usually a long-term process.

In contrast, pulsed voltage surge ageing and magnet wire failure does not require the presence of a gas media. Pulsed voltage surge failure instead requires repetitive or pulsed voltage surges having relatively short rise times, or high voltage to rise time ratios, relatively high frequency of pulse and relatively high impulse energy, and occurs in relatively high temperatures generated thereby. Given high voltages and minimum rise times, pulsed voltage surge failure can occur relatively quickly, and is believed to be predominant cause of failure in variable frequency, PWM, and/or inverter driven motors.

Some efforts have been already made in order to overcome the above mentioned drawbacks.

For example, U.S. Pat. No. 4,546,041 relates to a corona-resistant wire enamel composition comprising a polyetherimide resin and from about 1% to about 35% by weight of dispersed alumina particles of a finite size less than about 0.1 μm, the alumina particles being dispersed therein by high shear mixing.

U.S. Pat. No. 6,060,162 relates to a pulsed voltage surge resistant magnet wire comprising a conductor, a continuous and concentric and flexible uniform coat of base insulation material superimposed on said conductor, an essentially continuous and concentric and uniform pulsed voltage surge shield superimposed on said coat, said shield comprising a continuous, concentric and essentially uniform layer of particulate material and binder overlaying said coat of insulation material, said shield having from about 1% to about 65% by weight of said particulate material uniformely disbursed through said binder, and a continuous and concentric and flexible and uniform top coat of insulation material superimposed on said shield, said conductor and said coats and shield being in compliance with AINSI/NEMA MW 100 1993. Said insulation material may be selected from polyamides, polyimides, polyamideimides, polyesters, polyesterimide, polyetherimides, polyesteramideimides, polyamide ester, polyimide esters, polyarylsulfones, polyvinyl acetals, polyurethanes, epoxy resins, acrylic resins and combination thereof. Said particulate material may be selected from metallic oxides such as, for example, titanium dioxide, alumina, silica, zirconium oxide, zinc oxide, iron oxide; various naturally occuring clays; and mixtures thereof.

U.S. Pat. No. 6,087,592 relates to an enamelled wire having high resistance to partial discharge including an electrical conductor and at least two layers of enamel on the conductor. At least one of these layers is made from resin charged with weakly conductive particles. The outhermost layer constitutes an overcoat and is made from thermoadherent resin. At least the layer directly underlying the overcoat is made from the resin charged with said particles.

U.S. Pat. No. 6,100,474 relates to a magnet wire insulation designed to withstand voltage wave shapes present in inverter driven motors for a sustained period of time. A large surface area inorganic oxide, e.g. fumed silica, may be added into the magnet wire insulation for providing improved resistance to insulation degradation. Alternatively, a mixture of large surface area inorganic oxide with a low resistivity oxide, e.g. chromium oxide, provides a greater improvement in resistance to insulation degradation.

European patent application EP 287,813 relates to an electrical conductor provided with an electrical insulation surrounding the conductor and a surrounding protective layer which protects the insulation against degradation caused by corona. The protective layer consists of an organic polymer containing at least 10% by volume of a powdered filler material in the form of chromium oxide, iron oxide, or a mixture of chromium oxide and iron oxide.

Japanese patent application JP 50-13957 relates to polytetrafluoroethylene covered electrical wire having an intermediate covering layer of polyfluoroethylene propylene, which may contain a powder with conducting characteristics. It is said that, when the covered electrical wire is used under conditions of high electrical pressure, no insulation breakage due to corona discharged occurs and, moreover, that said electrical wire has better heat resistance, resistance to chemicals and other electrical characteristics.

Moreover, the magnet wires have to be endowed also with excellent windability, lubricity and abrasion resistance.

For example, Japanese patent application JP 56-106976 relates to an insulated electrical wire in which the conductor is coated and baked with an insulating layer containing from 0.1 to 10 wt parts with respect to 100 wt parts of the resin component of an ultra-fine tetrafluoroethylene resin having an average particle diameter of 10 μm or less. It is said that the insulated electrical wire has a low friction coefficient and better abrasion resistance. Moreover, no loss of heat resistance occurred.

Japanese Patent Application JP 3-245417 relates to a method of manufacturing an insulated electrical wire in which a fluororesin (for example, polytetrafluoroethylene resin) is dissolved in a solvent having a surface tension of 30 dyn/cm or less at 25° C. (for example, alcohol-based, ketone-based or aromatic hydrocarbon-based solvent). The resulting solution is used to coat the conductor. It is said that the fluororesin can be easily and homogeneously dispersed on the insulation coating, the external appearance of the insulated electrical wire is good and a stable low friction coefficient is obtained.

Japanese patent application JP 4-115411 relates to an insulated electrical wire comprising one or more insulating layers in which a powder comprising a mixture of polytetrafluoroethylene resin and polyethylene resin, said powder having a specific gravity within the range of from 0.98 to 1.11, is added to the most outer insulating layer. It is said that the insulated electrical wire has improved lubricity and abrasion resistance.

Japanese patent application JP 06-275128 relates to a resin composition for electrical insulation comprising 100 parts by weight of synthetic resin (for example, polyurethanes, polyesters, polyesterimides, polyamides), 0.1-10 parts by weight of tetrafluoroethylene and 0.1-10 parts by weight of an ammonium salt having the following formula $CF_3-(CF_2)_n-COONH_4$ wherein n is an integer from 1 to 20. It is said that the resin composition gives an insulated wire having good appearance, good sliding properties and good antifriction properties.

U.S. Pat. No. 4,716,079 relates to a magnet wire wherein insulating layer made of synthetic resin film (for example, polyvinylformals, polyesters, polyesterimides, polyesteramideimides, polyamideimides, polyimides, polyhydanthoins, polyurethanes, polyamides, epoxy resins, acrylic resins, polyetherirmides) is formed on the conductor and a lubricant layer made of an intimate mixture of natural wax as a major constituent and thermosetting and fluorocarbon resin compounded therewith is formed on the insulating layer. Thermosetting resins useful for this purpose are, for example, an ammonium or alcohol solution of shellac, a water dispersion of acrylic resin, an aqueous emulsion of water soluble phenolic resin. Fluorocarbon resins useful for this purpose are polytetrafluoroethylene (PTFE), a fluorinated ethylene-propylene copolymer (FEP), a polytrifluorochloroethylene (PTFCE). It is said that the magnet wire is excellent in windability, lubricity and abrasion resistance.

SUMMARY OF THE INVENTION

The Applicant has now found that it is possible to obtain a magnet wire having high resistance to pulsed voltage surges utilizing, as insulation layer, a composition comprising at least a polymeric resin, at least a fluorinated organic filler and at least a fluorinated non-ionic surfactant. Moreover, the magnet wire having said insulating layer also shows good sliding properties and high abrasion resistance. Said improvements are obtained without negatively affect the resistance to corona effect. Moreover, the use of a fluorinated non-ionic surfactant allows to obtain a stable and homogeneous dispersion of the fluorinated organic filler without causing any negative effect in the electrical characteristics of the magnet wire. Said insulation layer, despite the fact that the fluorinated organic filler presents the tendency to migrate to the external surface creating an inert surface insulation, does not present any adhesion problem to either the conductor or the adjacent layers.

Therefore in a first aspect, the present invention relates to a magnet wire including at least one conductor and at least one insulating layer, said insulating layer including a composition comprising:

(a) at least a polymeric resin;
(b) at least a fluorinated organic filler;
(c) at least a non-ionic fluorinated surfactant.

According to a preferred embodiment, said composition may also comprises an inorganic filler (d).

According to one preferred embodiment, said at least one insulating layer is directly in contact with the conductor.

According to another preferred embodiment, the magnet wire may also comprises at least one intermediate insulating layer radially internal with respect to said at least one insulating layer.

According to another preferred embodiment, said at least one intermediate insulating layer includes a composition comprising:

(a) at least a polymeric resin; optionally with
(d) at least an inorganic filler.

In a second aspect, the present invention relates to a method for improving resistance to pulsed voltage surges of a magnet wire which comprises coating a magnet wire with at least an insulating layer including a composition comprising:

(a) at least a polymeric resin;
(b) at least a fluorinated organic filler;
(c) at least a non-ionic fluorinated surfactant.

According to one preferred embodiment, the polymeric resin (a) may be selected from: polyesters, polyamides, polyimides, polyurethanes, polyetherimides, polyesteramideimides, epoxy resins, acrylic resins, polyamideimides, polyesterimides, nylon, polyarylsulfones, polyvinyl formals, polyvinyl acetals, polyvinyl butyrals, polyhidantoins, or mixture thereof. Particularly preferred are: polyesterimides, polyamideimides.

According to a preferred embodiment, the fluorinated organic filler (b) may be selected from: polytetrafluoroethylene (PTFE), tetrafluoroethylene-perfluoroalkylvinylether copolymer (PFA), tetrafluoroethylene-hexafluoropropylene copolymer (FEP), tetrafluoroethylene-hexafluoropropylene-perfluoroalkyl-vinyl ether copolymer (EPE), tetrafluoroethylene-ethylene copolymer (ETFE), polychlorotrifluoroethylene (PCTFE), chlorotrifluoroethylene-ethylene copolymer (ECTFE), polyvinylidene fluoride (PVdF), polyvinyl fluoride (PVF), or mixture thereof. Particularly preferred is polytetrafluoroethylene (PTFE).

According to one preferred embodiment, the fluorinated organic filler (b) has an average particle size of from 0.3 μm to 30 μm, preferably from 1.8 μm to 4 μm.

The fluorinated organic filler (b) is preferably added to the composition in an amount of from 1% by weight to 30% by weight, more preferably from 3% by weight to 15% by weight, with respect to the weight of the polymeric resin.

Examples of fluorinated organic filler (b) which are currently commercially available are the products Teflon® and Tefzel® from DuPont.

According to one preferred embodiment, the non-ionic fluorinated surfactant (c) may be represented by the following general formula (I):

$$R_f-(CH_2CH_2O)_z-H \quad (I)$$

wherein $R_f$ is a $C_1$-$C_{26}$-perfluoroalkyl group, preferably a perfluoroalkyl group of formula F—$(CF_2CF_2)_y$— wherein z is an integer ranging from 1 to 26 and y is an integer ranging from 1 to 9.

Examples of non-ionic fluorinated surfactant (c) which are currently commercially available are the products Zonyl® from DuPont.

The non-ionic fluorinated surfactant (c) is preferably added to the composition in an amount of from 0.1% by weight to 15% by weight, more preferably from 0.25% by weight to 10% by weight, with respect to the weight of the fluorinated organic filler (b).

According to one preferred embodiment, the inorganic filler (d) may be selected from: metal oxides such as, for example, titanium dioxide, alumina, silica, zirconium oxide, zinc oxide, iron oxide, barium titanate; variuos naturally occurring clays; carbon black; or mixture thereof. Particularly preferred is titanium oxide and carbon black.

The inorganic filler (d) is preferably added to the composition in an amount of from 5% by weight to 50% by weight, more preferably from 10% by weigth to 30% by weight, with respect to the weight of the polymeric resin (a).

In the case in which carbon black is used as inorganic filler (d), said carbon black may be conductive or non-conductive.

Example of carbon black which are currently commercially available is the products Vulcan® 72P type Extra Conductive Furnace (ECF) from Cabot Corporation.

The carbon black is preferably added to the composition in an amount of from 0.1% by weigth to 10% by weight, more preferably from 3% by weigth to 6% by weight, with respect to the weight of the polymeric resin (a).

The composition according the present invention may be produced according to different processes. For examples, said composition may be produced according to a process comprising:

(A) dissolving at least one fluorinated non-ionic surfactant (c) in at least one polar solvent so as to obtain a solution;

(B) dispersing at least one fluorinated organic filler (b) in powder form into the solution obtained in step (A) so as to obtain a solvent dispersion;

(C) mixing the solvent dispersion obtained in step (B) into a polymeric resin so as to obtain a composition.

Polar solvent which may be advantageously used in the above mentioned process may be selected from: alcohols such as, for example, isopropyl alcohol, n-butyl alcohol; esters such as, for example, butyl acetate; aromatic hydrocarbons such as, for example, cresol, phenol; ketones such as, for examples, N-methyl-2-pyrrolidone.

According to one preferred embodiment, the fluorinated organic filler (b) and the non-ionic fluorinated surfactant (c) are added to the said solvent dispersion in an amount of from 10% by weight to 80% by weight, preferably from 50% by weight and 70% by weight, with respect to the weight of said solvent dispersion.

The process above disclosed may be carried out according to known techniques. For example, step (A) may be carried out by stirring, while step (B) usually requires a high shear mixer such as, for example, Cowles mixer, preferably followed by an intense mixing action to disrupt granules or aggregates which may form in the solvent dispersion (e.g. by means of a milling machine such as, for example, roller mills, ball mills, cone mills, ball vibrating mills). Step (C) usually requires a high shear mixer such as, for example, Cowles mixer.

The composition obtained as disclosed above is subsequently applied on the conductor. The application may be carried out utilizing a multipass application by dies and vertical oven curing as disclosed, for example, in U.S. Pat. No. 4,546,041 and U.S. Pat. No. 6,060,162, or a solvent application as disclosed, for example, in U.S. Pat. No. 4,393,809.

The thickness of the insulating layers according to the present invention is from 0.5 μm to 100 μm, preferably from 1 μm to 60 μm.

In the case of using more than one insulating layer, the total thickness of the insulating layers is usually from 5 μm to 300 μm depending on the diameter range and on the shape of the conductor (round or rectangular). Preferably, in the case of motor coils production, the total thickness of the insulation layers is from 20 μm to 200 μm.

BRIEF DESCRIPTION OF THE DRAWINGS

This description is provided below with reference to the attached drawings, provided for guidance only and without restrictive intent, in which.

DETAILED DESCRIPTION OF THE INVENTION

Figure 1:
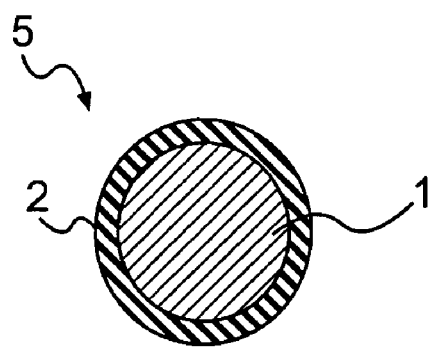
FIG. 1 shows schematically the right cross-section of a magnet wire having a circular section comprising, from the inside outwards, a conductor (1) and an insulating layer (2) according to the present invention.

With reference to FIG. 1, the magnet wire 5 comprises a conductor I and an insulating layer 2 made of a mixture of a polymeric resin and a fluorinated organic filler according to the present invention.

Figure 2:
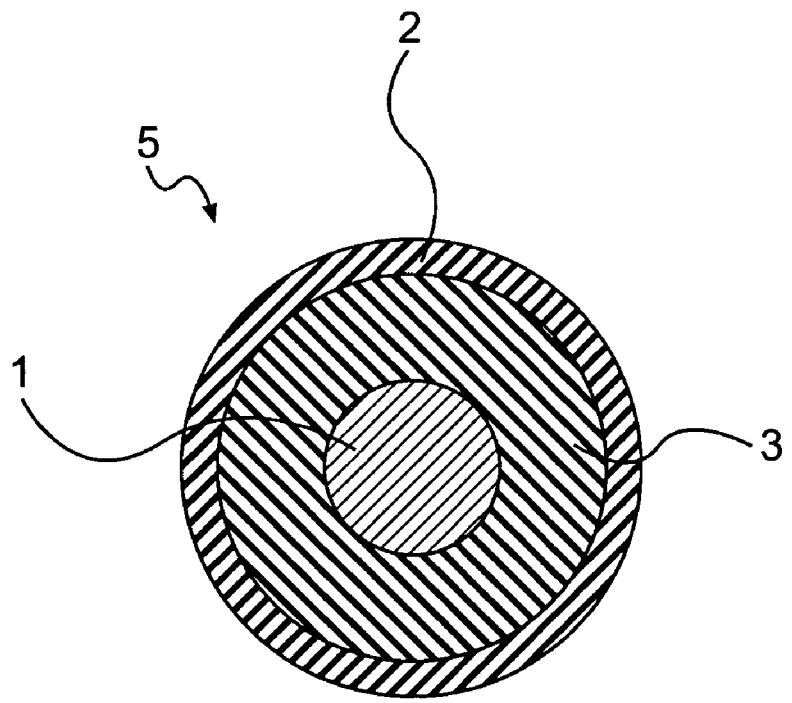
FIG. 2 shows schematically the right cross-section of a further embodiment of a magnet wire comprising, in addition to the elements reported in FIG. 1, an intermediate insulating layer (3), placed between the conductor (1) and the insulating layer (2) according to the present invention.

With reference to FIG. 2, the magnet wire 5 comprises a conductor 1, an intermediate insulating layer 3 made of a polymeric resin and an insulating layer 2 made of a mixture of a polymeric resin and a fluorinated organic filler according to the present invention.

Figure 3:
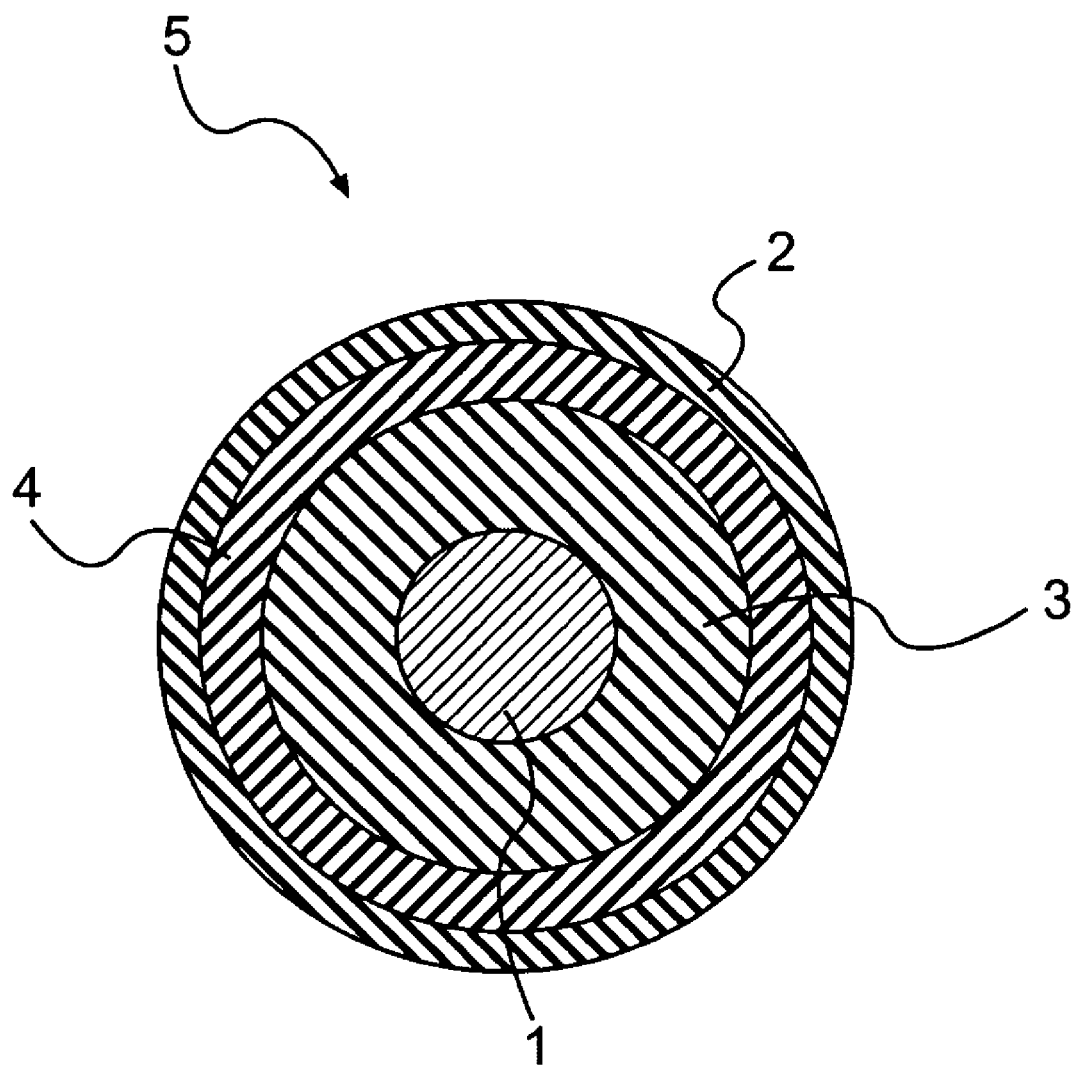
FIG. 3 shows schematically the right cross-section of a further embodiment of a magnet wire comprising, in addition to the elements reported in FIG. 2, a further intermediate insulating layer (4), placed between the insulating layer (3) and the insulating layer (2) according to the present invention.

With reference to FIG. 3, the magnet wire 5 comprises a conductor 1, a first intermediate insulating layer 3 made of a polymeric resin, a second intermediate insulating layer 4 made of a mixture of a polymeric resin and a metal oxide, and an insulating layer 2 made of a mixture of a polymeric resin and a fluorinated organic filler according to the present invention.

With regard to FIGS. 4 and 5, a better explanation of the same will be given below.

FIGS. 1, 2 and 3 show only three possible embodiments of a magnet wire according to the present invention: it goes without saying that alternative embodiments may be devised without thereby departing from the scope of the present invention.

Although the present description mainly focuses on magnet wire useful for coils winding of AC inverter driven motor, said magnet wire can be used also in conventional coils such as, for example, transformer, conventional motors, electronic equipment.

The present invention is now further described in the examples which follows, which is given purely for illustrative purposes and should not be considered as limiting the invention in any way.

EXAMPLE 1

Preparation of the Enamel Composition 3 g of non-ionic fluorinated surfactant (Zonyl® FSN-100 from DuPont) and 37 g of isopropyl alcohol were mixed by stirring to obtain a solution. 60 g of polytetrafluoroethylene (Teflon® MP 1100 from DuPont having an average particle size of 3 µm) were added to said solution and were milled in a three-roll mill, at room temperature, to obtain a solvent dispersion.

The obtained solvent dispersion (100 g) was slowly added to a 1760 g of a commercial poly(esterimide) enamel class H (Terebec® 533 from Basf) comprising 38.2% by weight of the poly(esterimide) resin in a solvent system composed by cresol, phenol and aromatic hydrocarbon solvents, in a Cowles type mixer and the mixture was maintained under stirring, for 18 hours, at a temperature of 30° C.-40° C. in order to obtain a homogeneous dispersion.

EXAMPLE 2

Preparation of the Enamel Composition 2 g of non-ionic fluorinated surfactant (Zonyl® FSN-100 from DuPont) and 48 g of N-methyl-2-pyrrolidone were mixed by stirring to obtain a solution. 50 g of polytetrafluoroethylene (Teflon® MP 1100 from DuPont having an average particle size of 3 µm) were added to said solution and were milled in a three-roll mill, at room temperature, to obtain a solvent dispersion.

The obtained solvent dispersion (100 g) was slowly added to a 1852 g of a commercial poly(amideimide) enamel class 200 C (Sivamid® 595/34 from Altana Wire Enamels & Electrical Insulation) comprising 30% by weight of the poly(amideimide) resin in a solvent system composed by cresilic N-methyl-pyrrolidone and xylol, in a Cowles type mixer and the mixture was maintained under stirring, for 18 hours, at a temperature of 30° C.-40° C. in order to obtain a homogeneous dispersion.

EXAMPLE 3

Magnet Wire Preparation

A first layer of a commercial poly(esterimide) enamel class H (Terebec® 533 from Basf) used also in Example 1, was applied to a 18 AWG copper wire using a multipass coating and wiping dies and heating in a vertical oven curing to a temperature of from 300° C. to 600° C., at a speed of from 18 m/min to 60 m/min, to build a coating on the wire of 60 µm thickness.

A second layer of the composition obtained in Example 1, was applied by means of the above technique to build a coating on the wire of 25 µm thickness.

EXAMPLE 4

Magnet Wire Preparation

A first layer of a commercial poly(esterimide) enamel class H (Terebec® 533 from Basf) used also in Example 1, was applied to a 18 AWG copper wire using a multipass coating and wiping dies and heating in a vertical oven curing to a temperature of from 300° C. to 600° C., at a speed of from 18 m/min to 60 m/min, to build a coating on the wire of 62 µm thickness.

A second layer of the composition obtained in Example 2, was applied by means of the above technique to build a coating on the wire of 26 µm thickness.

EXAMPLE 5

Magnet Wire Preparation

A first layer of a commercial poly(esterimide) enamel class H (Terebec® 533 from Basf) used also in Example 1, was applied to a 18 AWG copper wire using a multipass coating and wiping dies and heating in a vertical oven curing to a temperature of from 300° C. to 600° C., at a speed of from 18 m/min to 60 m/min, to build a coating on the wire of 62 µm thickness.

A second layer of a commercial poly(esterimide) enamel class H (Terebec® 533 from Basf) used also in Example 1, additivated with 15% by weight with respect to weight of the resin of titanium dioxide having an average particle size of 0.5 µm was applied by means of the above technique to build a coating on the wire of 14 µm thickness.

A third layer of the composition obtained in Example 2, was applied by means of the above technique to build a coating on the wire of 14 µm thickness.

EXAMPLE 6

Properties Evaluation

The magnet wires obtained as disclosed in Examples 3, 4 and 5 were submitted to the following tests in order to evaluate their properties. The data obtained are reported in Table 1.

As a reference, a standard magnet wire was obtained as follows.

A first layer of a commercial poly(esterimide) enamel class H (Terebec® 533 from Basf) used also in Example 1, was applied to a 18 AWG copper wire using a multipass coating and wiping dies and heating in a vertical oven curing to a temperature of from 300° C. to 600° C., at a speed of from 18 m/min to 60 m/min, to build a coating on the wire of 62 μm thickness.

A second layer of a commercial poly(amideimide) enamel class 200 C (Sivamid® 595/34 from Altana Wire Enamels & Electrical Insulation) used also in Example 2, was applied by means of the above technique to build a coating on the wire of 20 μm.

Coefficient of Static Friction

Figure 4:
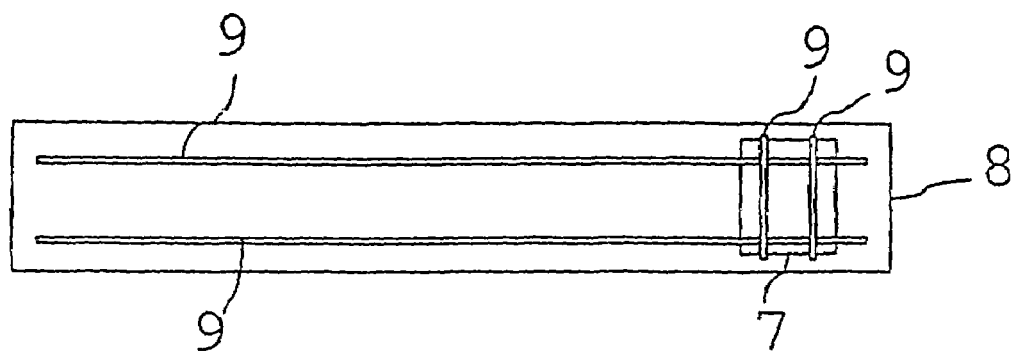
FIG. 4 shows schematically the top view of a device used to measure the coefficient of static friction of a magnet wire.
Figure 5:
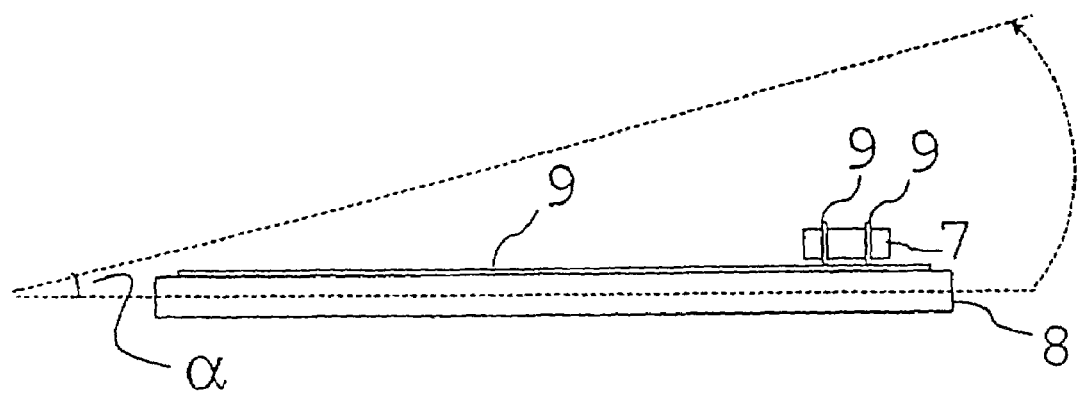
FIG. 5 shows the lateral view of the device of FIG. 4.

The device used for the measurement of the coefficient of static friction of the enamelled wires, is shown in FIGS. 4 and 5.

Two samples wires 9, were wound parallely around a metal block 7 having the following dimensions 100 mm×40 mm×6 mm and weighing 200 g. The block 7 with the wounded wires was then placed on two parallel samples of the same wires 9 which were placed on polished metal block 8. The inclination of the polished metal block 8 was increased until block 7 started to move. At this point, the inclination angle α was recorded. The coefficient of static friction (μ) was calculated by the following equation:

(μ)=tan α.

The obtained data are reported in Table 1.

Abrasion Resistance

The abrasion resistance was determined according to NEMA magnet wire standard MW1000—Part 3—Item 3.8.

AC Voltage Resistance Test

In order to evaluate the resistance to pulsed voltage surges of the magnet wire according to the present invention, the following test was carried out.

Standard 18 AWG twisted pairs prepared to dielectric strength test according to NEMA magnet wire standard MW1000—Part 3—Item 3.8.

Each wire pair was twisted 8 revolutions. The insulation was stripped off at each end of the twisted pair. The remaining conductor portion was used as an electrode. The twisted pair was mounted in the sample cell and their ends were connected (one end of the wire was connected to the positive output of the power supply and the other end to the negative output of the power supply) to a high voltage power supply applying 3500 volts at 60 Hz. The tests were performed in an air circulating oven at 120° C. until failure: the time to failure was recorded and the obtained data have been reported in Table 1.

TABLE 1

|  | Reference | Ex. 3 | Ex. 4 | Ex. 5 |
| --- | --- | --- | --- | --- |
| Coefficient of static friction | 0.07–0.09 | 0.06–0.08 | 0.05–0.06 | 0.05–0.06 |
| Abrasion resistance (g) | 1200–1600 | 1700–1800 | 1800–1950 | 1800–1950 |
| AC voltage resistance test (min) | 90–120 | 100–200 | 130–330 | 1300–1600 |

The data reported in the above Table 1 were obtained from the tests carried out on 5 samples and are expressed as a range corresponding to the minimum and maximum values. The data given above demonstrate that the magnet wires according to the present invention (Examples 3-5) have improved resistance to pulsed voltage surges. In addition, the magnet wires according to the presence invention also show an improvement either in the coefficient of static friction and in the abrasion resistance.

What is claimed is:

1. A magnet wire including at least one conductor and at least one insulating layer, said insulating layer including a composition comprising:
   (a) at least a polymeric resin;
   (b) at least a fluorinated organic filler; and
   (c) at least a non-ionic fluorinated surfactant;
   wherein said at least a polymeric resin is not reacted with said at least a non-ionic fluorinated surfactant.

2. The magnet wire according to claim 1, in which said composition further comprises an inorganic filler (d).

3. The magnet wire according to claim 2, in which the inorganic filler (d) is selected from metal oxides, naturally occurring clays, carbon black, or mixtures thereof.

4. The magnet wire according to claim 3, in which the inorganic filler (d) is carbon black.

5. The magnet wire according to claim 4, in which the carbon black is added to the composition in an amount of from 0.1% by weight to 10% by weight with respect to the weight of the polymeric resin (a).

6. The magnet wire according to claim 5, in which the carbon black is added to the composition in an amount of from 3% by weight to 6% by weight with respect to the weight of the polymeric resin (a).

7. The magnet wire according to claim 3, in which the metal oxides are selected from titanium dioxide, alumina, silica, zirconium oxide, zinc oxide, iron oxide, or barium titanate.

8. The magnet wire according to claim 7, in which the metal oxide is titanium oxide.

9. The magnet wire according to claim 2, in which the inorganic filler (d) is added to the composition in an amount of from 5% by weight to 50% by weight with respect to the weight of the polymeric resin (a).

10. The magnet wire according to claim 9, in which the inorganic filler (d) is added to the composition in an amount of from 10% by weight to 30% by weight with respect to the weight of the polymeric resin (a).

11. The magnet wire according to claim 1, in which said at least one insulating layer is directly in contact with the conductor.

12. The magnet wire according to claim 1, in which at least one intermediate insulating layer radially internal with respect to said at least one insulating layer is present.

13. The magnet wire according to claim 12, in which said at least one intermediate insulating layer includes a composition comprising:
   (a) at least a polymeric resin.

14. The magnet wire according to claim 13, further comprising:
   (d) at least one inorganic filler.

15. The magnet wire according to claim 14, in which the inorganic filler (d) is selected from metal oxides, naturally occurring clays, carbon black, or mixtures thereof.

16. The magnet wire according to claim 15, in which the inorganic filler (d) is carbon black.

17. The magnet wire according to claim 15, in which the metal oxides are selected from titanium dioxide, alumina, silica, zirconium oxide, zinc oxide, iron oxide, or barium titanate.

18. The magnet wire according to claim 17, in which the metal oxide is titanium oxide.

19. The magnet wire according to claim 16, in which the carbon black is added to the composition in an amount of from 0.1% by weight to 10% by weight with respect to the weight of the polymeric resin (a).

20. The magnetic wire according to claim 19, in which the carbon black is added to the composition in an amount of from 3% by weight to 6% by weight with respect to the weight of the polymeric resin (a).

21. The magnet wire according to claim 14, in which the inorganic filler (d) is added to the composition in an amount of from 5% by weight to 50% by weight with respect to the weight of the polymeric resin (a).

22. The magnet wire according to claim 21, in which the inorganic filler (d) is added to the composition in any amount of from 10% by weight to 30% by weight with respect to the weight of the polymeric resin (a).

23. The magnet wire according to claim 13, in which the polymeric resin (a) is selected from polyesters, polyamides, polyimides, polyurethanes, polyetherimides, polyesteramideimides, epoxy resins, acrylic resins, polyamideimides, polyesterimides, nylon, polyarylsulfones, polyvinyl formals, polyvinyl acetals, polyvinyl butyrals, polyhidantoins, or mixtures thereof.

24. The magnet wire according to claim 1, in which the polymeric resin (a) is selected from polyesters, polyamides, polyimides, polyurethanes, polyetherimides, polyesteramideimides, epoxy resins, acrylic resins, polyamideimides, polyesterimides, nylon, polyarylsulfones, polyvinyl formals, polyvinyl acetals, polyvinyl butyrals, polyhidantoins, or mixtures thereof.

25. The magnet wire according to claim 24, in which the polymeric resin (a) is selected from polyesterimides, or polyamideimides.

26. The magnet wire according to claim 1, in which the fluorinated organic filler (b) is selected from polytetrafluoroethylene (PTFE), tetrafluoroethylene-perfluoroalkylvinylether copolymer (PEA), tetrafluoroethylene-hexafluoropropylene copolymer (FEP), tetrafluoroethylene-hexafluoropropylene-perfluoro-alkyl-vinyl ether copolymer (EPE), tetrafluoroethylene-ethylene copolymer (ETFE), polychloro-trifluoroethylene (PCTFE), chlorotrifluoroethylene-ethylene copolymer (ECTFE), polyvinylidene fluoride (PVdF), polyvinyl fluoride (PVF), or mixtures thereof.

27. The magnet wire according to claim 26, in which the fluorinated organic filler (b) is polytetrafluoroethylene (PTFE).

28. The magnet wire according to claim 1, in which the fluorinated organic filler (b) has an average particle size of from 0.3 μm to 30 μm.

29. The magnet wire according to claim 1, in which the fluorinated organic filler (b) is added to the composition in an amount of from 1% by weight to 30% by weight, with respect to the weight of the polymeric resin.

30. The magnet wire according to claim 29, in which the fluorinated organic filler (b) is added to the composition in an amount of from 3% by weight to 15% by weight, with respect to the weight of the polymeric resin.

31. The magnet wire according to claim 1, in which the non-ionic fluorinated surfactant (c) is represented by the following general formula (I):

wherein $R_f$ is a $C_1$-$C_{26}$-perfluoroalkyl group and z is an integer ranging from 1 to 26.

32. The magnet wire according to claim 31, in which $R_f$ is a perfluoroalkyl group of formula $F\mathrm{-}(CF_2CF_2)_y\mathrm{-}$ wherein y is an integer ranging from 1 to 9.

33. The magnet wire according to claim 1, in which the non-ionic fluorinated surfactant (c) is added to the composition in an amount of from 0.1% by weight to 15% by weight, with respect to the weight of the fluorinated organic filler (b).

34. The magnet wire according to claim 33, in which the non-ionic fluorinated surfactant (c) is added to the composition in an amount of from 0.25% by weight to 10% by weight with respect to the weight of the fluorinated organic filler (b).

35. A method for improving resistance to pulsed voltage surges of a magnetic wire which comprises coating a magnet wire with at least an insulating layer including a composition comprising:
 (a) at least a polymeric resin;
 (b) at least a fluorinated organic filler; and
 (c) at least a non-ionic fluorinated surfactant;
wherein said at least a polymeric resin is not reacted with said at least a non-ionic fluorinated surfactant.

36. The method according to claim 35, in which the composition further comprises an inorganic filler (d).

37. The method according to claim 36, in which the inorganic filler (d) is selected from metal oxides, naturally occurring clays, carbon black, or mixtures thereof.

38. The method according to claim 37, wherein the metal oxides are selected from titanium dioxide, alumina, silica, zirconium oxide, zinc oxide, iron oxide, or barium titanate.

39. The method according to claim 37, wherein the inorganic filler (d) is added to the composition in an amount of from 5% by weight to 50% by weight with respect to the weight of the polymeric resin (a).

40. The method according to claim 39, wherein the carbon black is added to the composition in an amount of from 0.1% by weight to 10% by weight with respect to the weight of the polymeric resin (a).

41. The method according to claim 35, in which the polymeric resin (a) is selected from polyesters, polyamides, polyimides, polyurethanes, polyetherimides, polyesteramideimides, epoxy resins, acrylic resins, polyamideimides, polyesterimides, nylon, polyarylsulfones, polyvinyl formals, polyvinyl acetals, polyvinyl butyrals, polyhidantoins, or mixtures thereof.

42. The method according to claim 35, in which the fluorinated organic filler (b) is selected from polytetrafluoroethylene (PTFE), tetrafluoroethylene-perfluoroalkylvinylether copolymer (PEA), tetrafluoroethylene-hexafluoropropylene copolymer (FEP), tetrafluoroethylene-hexafluoropropylene-perfluoro-alkyl-vinyl ether copolymer (EPE), tetrafluoroethylene-ethylene copolymer (ETFE), polychloro-trifluoroethylene (PCTFE), chlorotrifluoroethylene-ethylene copolymer (ECTFE), polyvinylidene fluoride (PVdF), polyvinyl fluoride (PVF), or mixtures thereof.

43. The method according to claim 35, in which the non-ionic fluorinated surfactant (c) is represented by the following general formula (I)

wherein $R_f$ is a $C_1$-$C_{26}$-perfluoroalkyl group and z is an integer ranging from 1 to 26.

44. The method according to claim 43, wherein $R_f$ is a perfluoroalkyl group of formula $F\mathrm{-}(CF_2CF_2)_y\mathrm{-}$ wherein y is an integer ranging from 1 to 9.

45. The method according to claim 35, wherein the fluorinated organic filler (b) has an average particle size of from 0.3 μm to 30 μm.

46. The method according to claim 35, wherein the fluorinated organic filler (b) is added to the composition in an amount of from 1% by weight to 30% by weight, with respect to the weight of the polymeric resin.

47. The method according to claim 46, wherein the fluorinated organic filler (b) is added to the composition in an amount of from 3% by weight to 15% by weight with respect to the weight of the polymeric resin.

48. The method according to claim 35, wherein the non-ionic fluorinated surfactant (c) is added to the composition in an amount of from 0.1% by weight to 15% by weight, with respect to the weight of the fluorinated organic filler (b).

49. The method according to claim 48, wherein the non-ionic fluorinated surfactant (c) is added to the composition in an amount of from 0.25% by weight to 10% by weight with respect to the weight of the fluorinated organic filler (b).

* * * * *

UNITED STATES PATENT AND TRADEMARK OFFICE
CERTIFICATE OF CORRECTION

PATENT NO.         : 7,253,357 B2
APPLICATION NO.    : 10/498993
DATED              : August 7, 2007
INVENTOR(S)        : Cipelli et al.

It is certified that error appears in the above-identified patent and that said Letters Patent is hereby corrected as shown below:

On Title page, item (75), line 2, "Säo" should read --São--.

On Title page, item (73), line 2, "Epeciais" should read --Especiais--.

Claim 26, column 11, line 34, "(PEA)," should read --(PFA),--.

Claim 42, column 12, line 45, "(PEA)," should read --(PFA),--.

Signed and Sealed this

Twenty-seventh Day of May, 2008

JON W. DUDAS
*Director of the United States Patent and Trademark Office*